Figure 1:
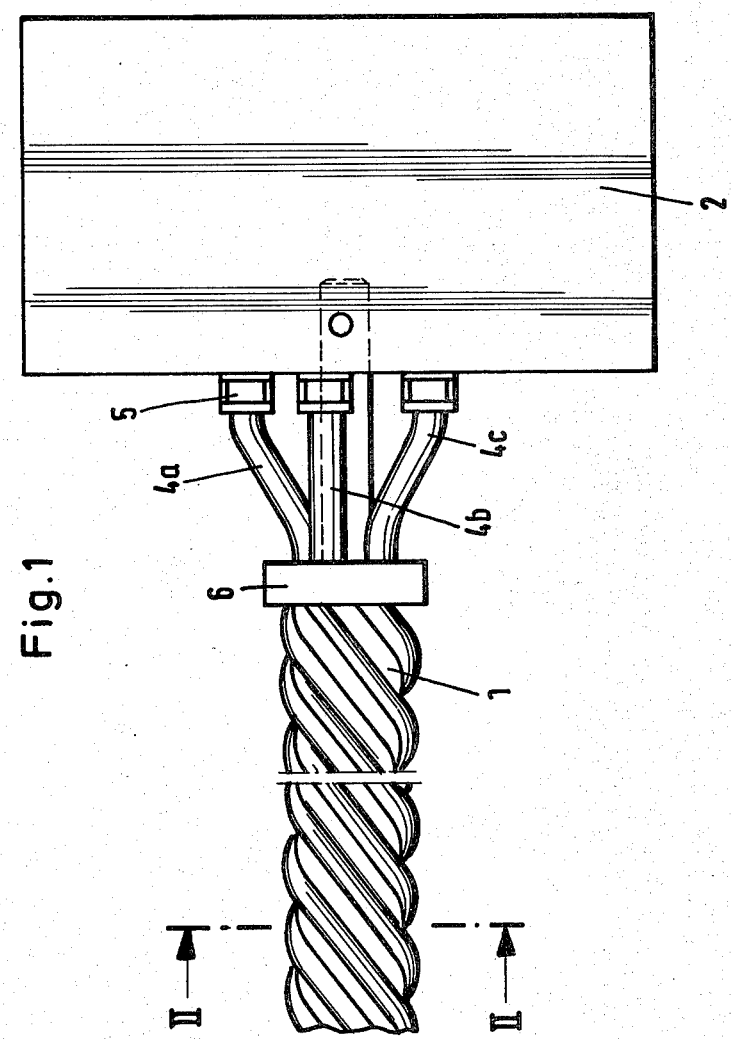

United States Patent [19]

Wendler et al.

[11] 4,452,661

[45] Jun. 5, 1984

[54] TUBE WINDING HEAD WITH FLEXIBLE SHAFTS

[75] Inventors: Manfred Wendler, Griesheim; Jürgen Marcinkowski, Mörfelden; Jürgen Brehm, Griesheim, all of Fed. Rep. of Germany

[73] Assignee: Techno-Chemi Kessler & Co. GmbH, Frankfurt, Fed. Rep. of Germany

[21] Appl. No.: 399,160

[22] Filed: Jul. 16, 1982

[30] Foreign Application Priority Data

Jul. 24, 1981 [AT] Austria .................................. 3281/81

[51] Int. Cl.³ .......................... B31C 1/00; B65H 81/00
[52] U.S. Cl. ..................................... 156/428; 156/429
[58] Field of Search ................... 156/195, 428, 244.13, 156/143, 429; 493/299, 302; 228/145

[56] References Cited

U.S. PATENT DOCUMENTS

| | | | |
|---|---|---|---|
| 2,136,867 | 11/1938 | Reed | 117/59 |
| 3,532,580 | 10/1970 | Kanao | 156/428 |
| 3,916,663 | 11/1975 | Takeshito | 228/145 |
| 4,343,672 | 8/1982 | Kanao | 156/428 |

FOREIGN PATENT DOCUMENTS

| | | |
|---|---|---|
| 2711236 | 11/1977 | Fed. Rep. of Germany . |
| 2714875 | 10/1978 | Fed. Rep. of Germany . |
| 2831433 | 2/1979 | Fed. Rep. of Germany . |
| 62349 | 7/1970 | Japan .................................. 156/195 |
| 1577849 | 12/1979 | United Kingdom . |

*Primary Examiner*—Michael W. Ball
*Attorney, Agent, or Firm*—W. G. Fasse; D. H. Kane, Jr.

[57] ABSTRACT

The frames of a tube winding machine comprises a cylinder with a series of spiral grooves milled in its surface to house rotary flexible shafts. The cross-section of each groove is a major segment of a circle. A guide ring is provided to ensure that the shafts enter the grooves in a direction parallel to the cylinder axis at the drive end.

4 Claims, 2 Drawing Figures

TUBE WINDING HEAD WITH FLEXIBLE SHAFTS

FIELD OF THE INVENTION

The invention relates to a tube winding head with flexible shafts for forming continuous length of tubing.

DESCRIPTION OF THE PRIOR ART

Winding heads of this kind are known in different forms.

The winding head according to the present invention falls into that class of winding heads described, for example, in British Patent Specification No. 1,557,849.

In the known apparatus, flexible feed shafts, for example six shafts, are mounted in grooves, which are more than semicircular in cross-section, in holding members which are disposed at a considerable distance from each other in the lengthwise direction of the winding apparatus.

The holding members are in turn rotatably mounted on a metal core and are fixed in their respective positions by screws.

The differing axial positioning of each holding member relative to the metal core makes it possible to adjust the degree of helical rotation of the feed shafts.

OBJECT OF THE INVENTION

The invention aims to provide such a tube winding head that there is no longer any necessity for setting up the helical configuration of the feed shafts while nonetheless ensuring the required extent of helical configuration of the feed shafts.

SUMMARY OF THE INVENTION

According to the invention a tube winding head in the holding means comprises a cylinder in the peripheral surface of which are longitudinal grooves which extend in a spiral configuration, for receiving respective feed shafts.

The shafts are held and guided over the entire length of the head, by means of the spiral grooves which are milled or otherwise framed with a smooth finish.

In addition, guiding the shafts over the entire length of the head ensures that the flexible shafts can be satisfactorily fixed in an angled position, over the entire length of the head.

The winding head according to the invention also enjoys the advantage that it may be easily produced at lower cost than hitherto, particularly when suitable ball cutters or millers are used.

BRIEF FIGURE DESCRIPTION

Figure 2:
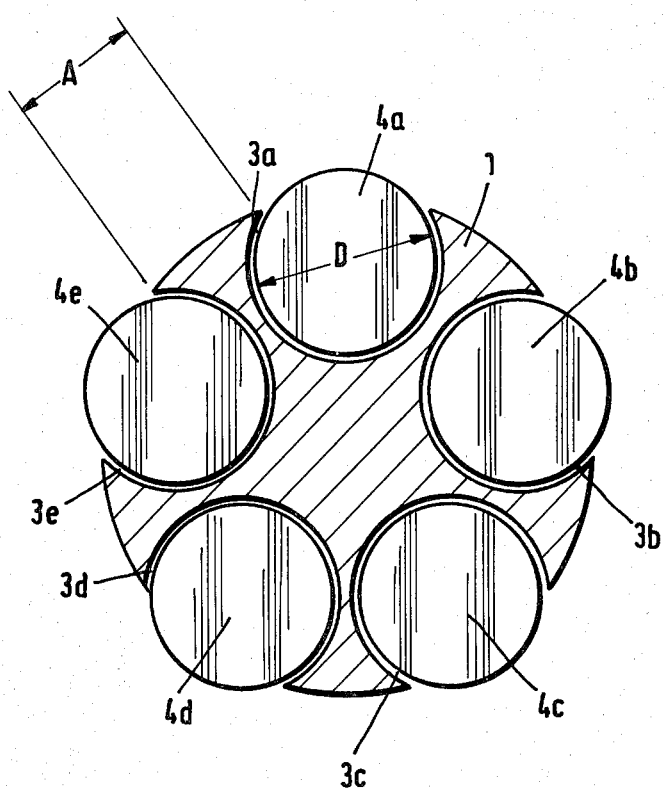

An embodiment of the invention is illustrated by way of example and in purely diagrammatic form in the accompanying drawings in which FIG. 1 shows in part a side view of a winding head according to the invention, and FIG. 2 shows a view on an enlarged scale in section taken along line II—II in FIG. 1.

DETAILED DESCRIPTION OF PREFERRED EXAMPLE EMBODIMENTS AND OF THE BEST MODE OF THE INVENTION

Referring to FIG. 1, a cylinder 1 is coaxially and rigidly secured in a planetary transmission arrangement 2. The cylinder 1 is provided in its peripheral surface with longitudinal grooves $3a$ to $3e$ which are cut or milled in a helical configuration. The grooves are provided for receiving flexible shafts $4a$ to $4e$.

The flexible shafts $4a$ to $4e$ are connected to the transmission arrangement 2 by connecting members 5. Each shaft is driven individually by the planetary transmission arrangement 2, by way of its connecting member 5, however, the cylinder 1 is stationary.

So that the flexible shafts $4a$ to $4e$ enter their longitudinal grooves $3a$ to $3e$ parallel to the axis of the cylinder 1, a guide ring 6 is associated with the cylinder 1.

As shown in FIG. 2 five grooves $3a$ to $3e$ are milled or cut into the cylinder 1. The cross-section of each groove is more than semicircular so that the flexible shafts $4a$ to $4e$ are reliably mounted and held in their grooves over the full length of the cylinder 1.

The number of flexible shafts 4 depends on the tube diameter. The drive transmission arrangement 2 is adapted to the number of shafts 4.

The circumferential spacing A between adjacent flexible shafts 4 is desirably less than the diameter D of each individual shaft 4.

However, as shown in FIG. 2, the circumferential spacings A are larger than the radius of the flexible shafts $4a$ to $4e$ so that each shaft is held in its groove along a circumferential length larger than half its circumference for the above mentioned reliable mounting of each flexible shaft over the full length of the cylinder 1. Stated differently and also as shown in FIG. 2 each groove has a radial depth larger than the radius of the respective flexible shaft for properly holding the shaft.

Although the invention has been described with reference to specific example embodiments, it will be appreciated that it is intended to cover all modifications and equivalents within the scope of the appended claims.

What is claimed is:

1. A tube winding head for forming continuous length of tubing, comprising a stationary cylinder forming a core having a central longitudinal axis and a given axial length, a plurality of longitudinal helical grooves in said cylinder, said grooves extending along the entire axial length of said cylinder, a flexible feed shaft of given diameter rotatably held in each of said helical grooves for guiding the respective flexible feed shaft along the entire axial cylinder length, said helical grooves having a radial depth, relative to said longitudinal cylinder, larger than one half of said given shaft diameter so that each groove encircles its shaft for more than one half of the shaft circumference, whereby holding means for said flexible shafts other than said helical grooves are obviated.

2. The tube winding head of claim 1, further comprising a guide ring (6) located at an entrance end of said helical grooves and surrounding said cylinder for guiding a free end of the respective flexible shaft into the respective groove in a direction extending substantially in parallel to said cylinder axis.

3. The tube winding head of claim 1, wherein said grooves are spaced from each other around the circumference of said cylinder by circumferential spacings (A) having a circumferential length smaller than said diameter of said flexible shafts.

4. The tube winding head of claim 1, wherein said helical grooves have a circumferential opening having a circumferential width smaller than the diameter of the respective flexible shaft.

* * * * *